US007020225B2

United States Patent
Sindhushayana et al.

(10) Patent No.: US 7,020,225 B2
(45) Date of Patent: Mar. 28, 2006

(54) FREQUENCY SEARCHER AND FREQUENCY-LOCKED DATA DEMODULATOR USING A PROGRAMMABLE ROTATOR

(75) Inventors: Nagabhushana T. Sindhushayana, San Diego, CA (US); Serguei A. Glazko, San Diego, CA (US); Peter J. Black, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 762 days.

(21) Appl. No.: 10/017,073

(22) Filed: Dec. 7, 2001

(65) Prior Publication Data

US 2002/0114405 A1 Aug. 22, 2002

Related U.S. Application Data

(60) Provisional application No. 60/262,691, filed on Jan. 19, 2001.

(51) Int. Cl.
*H04L 27/06* (2006.01)
*H04L 7/00* (2006.01)

(52) U.S. Cl. .................. 375/344; 375/371; 375/375
(58) Field of Classification Search ............... 375/354, 375/371, 373, 376, 316, 327, 344, 362, 147, 375/148, 375
See application file for complete search history.

(56) References Cited

U.S. PATENT DOCUMENTS

| | | | | |
|---|---|---|---|---|
| 4,604,583 A | * | 8/1986 | Aoyagi et al. ............... | 329/308 |
| 4,769,826 A | * | 9/1988 | Kubo et al. ................. | 375/240 |
| 4,943,982 A | * | 7/1990 | O'Neil et al. ............... | 375/327 |
| 5,440,587 A | * | 8/1995 | Ishikawa et al. ............ | 375/332 |
| 5,471,508 A | * | 11/1995 | Koslov ....................... | 375/344 |
| 5,696,797 A | * | 12/1997 | Bucher et al. ............... | 375/344 |
| 6,282,500 B1 | * | 8/2001 | Agrawal et al. .............. | 702/72 |
| 6,285,669 B1 | * | 9/2001 | Gutierrez .................... | 370/335 |
| 6,363,102 B1 | * | 3/2002 | Ling et al. .................. | 375/147 |
| 6,366,628 B1 | * | 4/2002 | Su et al. ..................... | 375/355 |
| 6,393,083 B1 | * | 5/2002 | Beukema ..................... | 375/371 |
| 6,466,566 B1 | * | 10/2002 | De Gaudenzi et al. ..... | 370/342 |
| 6,570,946 B1 | * | 5/2003 | Homol et al. ................ | 375/371 |
| 6,631,174 B1 | * | 10/2003 | Asahara et al. ............. | 375/344 |
| 6,700,926 B1 | * | 3/2004 | Heikkila et al. ............ | 375/221 |

\* cited by examiner

*Primary Examiner*—Kenneth Vanderpuye
*Assistant Examiner*—Jason M. Perilla
(74) *Attorney, Agent, or Firm*—Philip R. Wadsworth; Charles D. Brown; George C. Pappas

(57) ABSTRACT

A searcher is centered on frequency bins to search for an incoming signal. The frequency locked loop generates an initial phase signal and a phase increment signal that are input to an accumulator. The accumulator accumulates the phase increments over a predetermined interval. After the interval, the accumulator generates a control signal that instructs a rotator to perform a phase rotation function.

15 Claims, 4 Drawing Sheets

|  | 2-BIN 45° - ROTATOR $\theta$ (L) | 3-BIN 45° - ROTATOR $\theta$ (L) |
|---|---|---|
| Fd = +/- 400 Hz | 3 (682.6) | 5 (409.6) |
| Fd = +/- 800 Hz | 6 (341.3) | 8 (256) |
| Fd = +/- 1200 Hz | 3 (256) | 11 (186.2) |

FREQUENCY SEARCHER AND FREQUENCY-LOCKED DATA DEMODULATOR USING A PROGRAMMABLE ROTATOR

RELATED APPLICATIONS

This application claims the benefit of provisional U.S. Application Ser. No. 60/262,691, entitled "A METHOD FOR IMPROVED REVERSE LINK CDMA SIGNAL ACQUISITION USING THE SEARCHER WITH N-PSK PHASE ROTATOR FOR DOPPLER FREQUENCY COMPENSATION," filed Jan. 19, 2001, which is incorporated herein by reference in its entirety for all purposes.

BACKGROUND OF THE INVENTION

1. Field of the Invention

The present invention relates generally to communication systems. Particularly, the present invention relates to reverse link signal acquisition in a CDMA environment.

2. Description of the Related Art

The radio frequency (RF) spectrum is a limited commodity. Only a small portion of the spectrum can be assigned to each communications industry. The assigned spectrum, therefore, must be used efficiently in order to allow as many frequency users as possible to have access to the spectrum.

Multiple access modulation techniques are some of the most efficient techniques for utilizing the RF spectrum. Examples of such modulation techniques include time division multiple access (TDMA), frequency division multiple access (FDMA), and code division multiple access (CDMA).

CDMA modulation employs a spectrum technique for the transmission of information. The spread spectrum system uses a modulation technique that spreads the transmitted signal over a wide frequency band. This frequency band is typically substantially wider than the minimum bandwidth required to transmit the signal. A signal having a bandwidth of only a few kilohertz can be spread over a bandwidth of more than a megahertz.

CDMA communications systems typically use directional antennas located in the center of a cell and broadcasting into sectors of the cell. The cells are located in major metropolitan areas, along highways, and along train tracks to allow consumers to communicate both at home and while traveling.

All of the mobile telephones communicating in the CDMA system transmit on the same frequency. Therefore, in order for the base station to identify each mobile, each mobile is assigned a unique pseudorandom (PN) spreading code that identifies that particular mobile to the system.

The mobile begins the registration process with a CDMA system by sending out a preamble signal that is comprised of chips. A base station searches for the preamble to determine if a mobile station is trying to communicate with the system. The base station may have to integrate over thousands of chips to find the mobile's preamble signal. This is typically not a problem if the preamble signal is at the proper frequency being searched by the base station.

Due to the Doppler effect, the critical cells are the cells located near highways or railway tracks. If a mobile is approaching a base station, the Doppler effect increases the signal's frequency as observed by the base station. If the mobile is moving away from the base station, the base station observes a signal having a frequency that is less than the frequency transmitted by the mobile. The amount of frequency shift is a function of the speed of the mobile.

The frequency of a signal transmitted by the mobile is aligned with the local oscillator in the mobile. The base station's frequency is synchronized with the Global Positioning System. When the mobile acquires a signal from the base station, that signal's frequency will be off. The mobile uses this shifted frequency to adjust its local oscillator in order to transmit back on the same frequency it has received. The base station then receives a signal that is shifted again by the Doppler effect. The base station is therefore receiving a signal that has double the frequency error. The two-way Doppler offsets may be in the range from 420 Hz for highway traffic to 1200 Hz for high-speed trains.

A typical frequency searcher experiences difficulty finding the signals transmitted by mobile telephones due to the double Doppler effect. The double Doppler effect may reduce a mobile's signal as much as 24 db below the threshold used by the searcher to find mobile signals. There is a resulting need for a frequency searcher that is capable of acquiring mobile signals that are affected by Doppler shift.

SUMMARY OF THE INVENTION

The present invention encompasses a searcher that finds and tracks the frequency of a received signal. The received signal typically is experiencing a phase error from the phase that for which the searcher is looking. The searcher comprises a frequency locked loop that generates a phase increment signal in response to the detected phase error of the incoming signal. This phase error is used to generate a phase increment signal. An accumulator is coupled to the frequency locked loop to accumulate the phase increments. After the accumulator has accumulated a predetermined phase increment, the accumulation generates a control signal to a programmable rotator. The programmable rotator performs a phase rotation function in response to the control signal.

DETAILED DESCRIPTION OF THE PREFERRED EMBODIMENT

The searcher of the present invention incorporating a Frequency Locked Loop (FLL) with a programmable rotator eliminates the searcher coherent loss resulting from the Doppler effect. The present invention provides a significant improvement of the searcher sensitivity by replacing a periodic 90° rotation with a programmable rotation of multiples of 45°. The searcher's performance is substantially equivalent to the searching technique known in the art as frequency binning.

In frequency binning, the intermediate frequency (IF) of the local oscillator adjusts the offset frequency control logic so that the baseband signal is already corrected by the amount required. The amount of correction or offset by the local oscillator represents the bin spacing.

However, in order to perform frequency binning, the hardware needs to introduce the frequency offset into the received signal. This cannot be done on a per mobile basis since all the mobiles are received together as a CDMA signal. Additionally, in cases when the frequency bin offset is introduced into the baseband signal, multiplication is generally required and the bit width of the datapath must increase. This increases the hardware complexity in a non-linear fashion.

The searcher process of the present invention replaces the frequency binning process by phase compensation or rotation that is applied to the baseband I/Q samples. In the preferred embodiment, the rotation is limited to multiples of 45° steps. Alternate embodiments use other rotation limits, such as 90° phase rotations.

Figure 1:
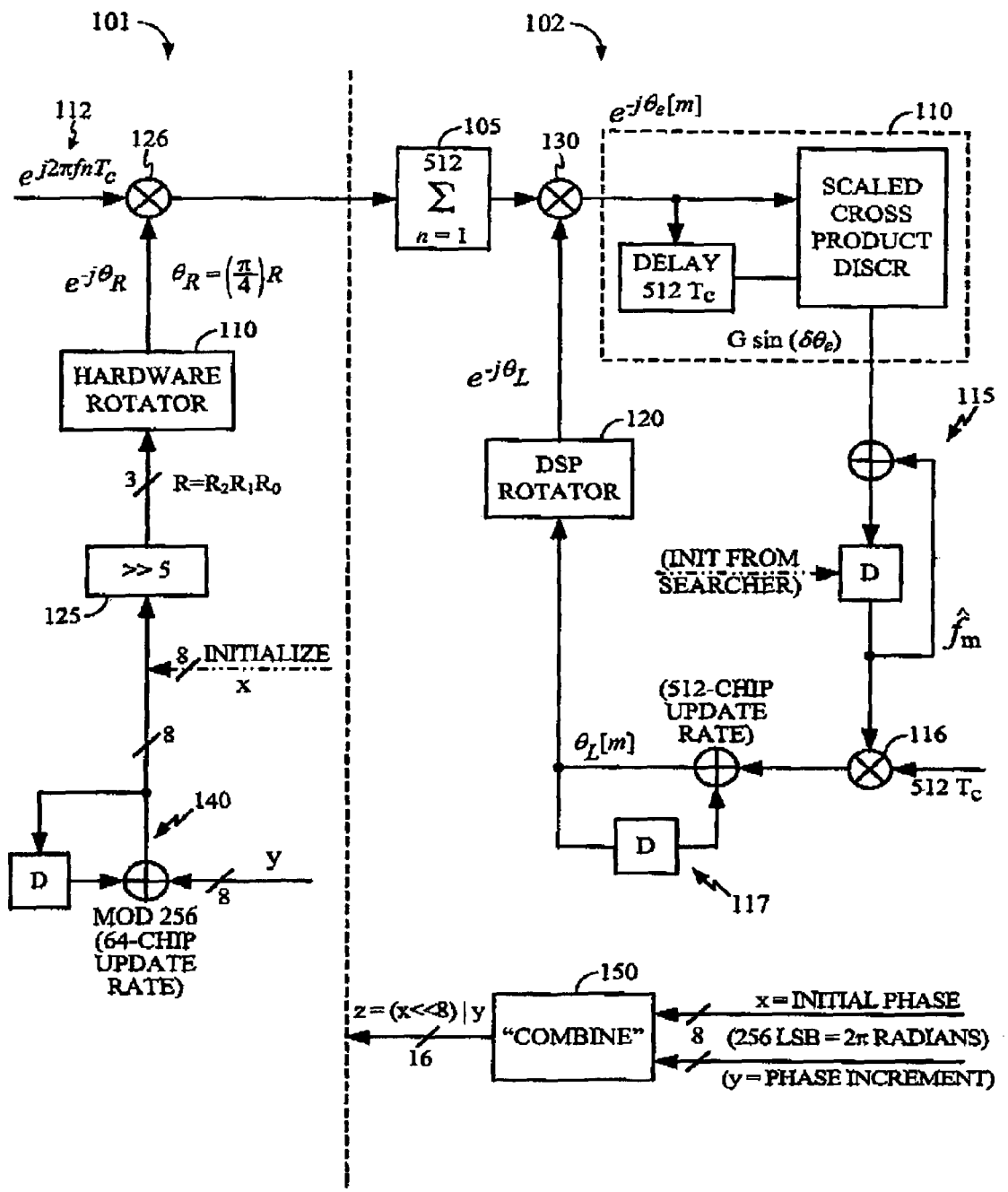
FIG. 1 shows a block diagram of the Frequency Locked Loop with the programmable rotator of the present invention.

The block diagram of FIG. 1 represents the searcher of the present invention, a FLL with hardware π/4 rotator. In the subsequent discussion of the present invention, each slot is divided into four 512-chip intervals, subsequently referred to as "segments". Each segment is further divided into 8 "sub-segments" each having a length of 64 chips. The pilot channel filtering is based on first accumulating the de-spread, hardware-rotated pilot chips over each segment and then suitably combining the result over four segments, spanning an interval of length 2048 chips.

Referring to FIG. 1, the preferred embodiment of the present invention is comprised of a rotator portion (101) together with a FLL portion (102). In the preferred embodiment, the rotator portion (101) is implemented in hardware while the FLL portion (102) is implemented in a digital signal processor (DSP).

In general, the FLL rotates each segment-sum and inputs it to a sliding window accumulator that sums its input over four segments. The output of the sliding window accumulator is then de-rotated to generate an output of the pilot filter that is valid for a given segment. The rotation of segment sums is used to align the phase of the pilot accumulated over each segment relative to one another. The de-rotation step is performed in order to align the phase of the pilot filter output with the phase of the signal at the midpoint of the segment over which the pilot filter output is used for demodulation.

Referring to FIG. 1, the first step in pilot filtering is to decover the pilot channel from the hardware rotator output and accumulate the result over each segment of 512 chips (105). The decovering operation is performed by the multiplier (126) that has the phase of the input signal, $e^{j2\pi f_n T_C}$, as one input. The phase signal is multiplied by the angle of rotation, $e^{-j\theta_R}$, from the hardware rotator (110). The generation of the angle of rotation is discussed subsequently.

The output of the multiplier (126) is the decovered pilot signal that is input to a summer (105) for accumulation over 512 chips. The accumulated signal is multiplied with the local estimate of the frequency error, $e^{-j\theta_L}$. The multiplier (130) output, $e^{-j\theta_e[m]}$, is then input to a discriminator (110) to determine the cross product. The FLL is driven by the output of the cross product between successive 512 chip accumulations of the pilot signal. The output of the discriminator (110) can be expressed as $G \sin(\delta\theta_e)$.

The output of the discriminator (110) is scaled by the "G" term to achieve the desired time constant/jitter variance. The cross product is applied to a loop filter (accumulator) (115) that is updated once every 512 chips. The output of the loop filter (115) provides the estimate, $\hat{f}_m$, of the frequency offset.

The FLL also keeps track of the phase relationship between different segments by associating each segment with an average phase. This is accomplished by multiplying the estimate of the frequency offset by $512T_C$ (116). At high frequency offsets, the instantaneous phase of the signal may vary considerably within each segment. The frequency estimate generated by the loop filter defines the phase shift between one segment and the next. It also defines the difference in the instantaneous phase of the signal from the beginning of the segment to the end.

The estimate of the average phase of the segment is used by the rotation and de-rotation of the pilot within the DSP portion (102). The hardware rotator (110) uses the estimated phase difference to rotate the signal within each segment so as to compensate for the change in instantaneous signal phase over the segment.

The rotator (110) operates under the hypothesis that the difference between the instantaneous phase of the signal and the average phase of the signal over the given segment varies linearly with time. It starts with an initial value, δ radians, at the beginning of the segment and ends with a final value of −δ radians at the end of the segment. With this assumption, the rotator (110) computes the average phase over each sub-segment (64-chip interval), quantized to the nearest multiple of π/4 radians. The resulting rotation is applied to each sub-segment of the received signal, over the given segment. As a result, the instantaneous phase of the signal at the output of the hardware rotator (110) remains nearly constant over each segment. The output of the hardware rotator (110) is used by the tracking loops, pilot filtering, and demodulation of a communications device.

The average phase of the signal over the segment is the same with or without the hardware rotator (110) of the present invention. Therefore, the hardware rotation process is transparent to pilot filtering and demodulation. The hardware rotator (110), however, provides coherence gain by reducing the variance of the instantaneous phase within each segment. If the frequency offset is small, then the hardware rotator (110) provides no rotation, and the system degenerates to the prior art implementation of a FLL.

In implementation, referring again to FIG. 1, the output of the multiplier (116) is input to an accumulator (117) that is updated every 512 chips. The output of the accumulator (117) is the angle of rotation, $\theta_L[m]$, that is input to the DSP rotator (120) to generate the local estimate of the frequency error, $e^{-j\theta_L}$.

The outputs of the FLL can be expressed in x (initial phase) and y (phase increment) terms as follows:

$$x = \{-f_m^*(N/2 - 32)T_C + \pi/8\} \bmod 2\pi$$

$$y = f_m^* \, 64T_C$$

where N is the coherent accumulation length that is 512 chips for FLL and demodulation. The x term is approximately equal to a negative of half of the phase shift suffered by the received signal over the length of the segment. The "32" term is used to center the initial phase to the first sub-segment of length 64 chips. The additional π/8 term is used so that the hardware needs to truncate, rather than round off, the value of its state variable in order to determine the actual phase rotation. In the 8-bit scaling used to represent x, π/8 radians corresponds to the number 16.

The phase increment, y, represents the phase shift of the signal over a sub-segment (64-chip interval). The same phase parameters may be used for the demodulation of all RAKE receiver fingers, in a communications device, associated with a given user.

During a frequency search, the above expressions for x and y are modified slightly by replacing the frequency offset estimate, $\hat{f}_m$, from the FLL with the frequency hypothesis, $f_H$, and by setting N equal to the number of chips of coherent accumulation used to compute the search energies. This results in x and y being expressed as:

$$x = \{-f_H * (N/2-32)T_C + \pi/8\} \bmod 2\pi$$

$$y = f_H * 64 T_C.$$

During a search for frequencies of mobile communication devices that are already being tracked, the search, in an alternate embodiment, may be restricted to the single frequency hypothesis. This is the frequency offset estimate that is closest to that estimated by the FLL for that particular mobile.

The hardware rotator (110) of the present invention maintains an 8-bit state variable whose value represents the phase angle at a high resolution of radians. In the preferred embodiment, this resolution is $\pi/128$ radians. During a demodulation or search dispatch, the DSP portion (102) of the present invention programs the hardware rotator (110) with a 16-bit word that contains the two 8-bit parameters, x and y.

Referring again to FIG. 1, the 16-bit programming word is generated by the combination (150) of x that has been left shifted 8 bits to truncate the 8-LSBs, and y. This combination is expressed as:

$$z = (x << 8) | y.$$

The higher significant byte of the 16-bit word contains the initial value of the state variable, which determines the phase of the rotator over the first sub-segment (64-chip interval). The lower significant byte of the 16-bit word contains the phase increment, which determines the amount by which the state variable is incremented from one sub-segment to the next. The phase accumulation is performed modulo 256, which corresponds to a full rotation of $2\pi$ radians. The actual phase rotation for a given sub-segment is obtained by truncating the 5 LSBs of the state variable, and multiplying the 3-bit result by $\pi/4$ radians.

During demodulation dispatches, the initial phase and phase increment are computed from an the estimated of the frequency offset provided by the FLL, and the length of the segment (N=512 chips).

The x and y outputs of the FLL are input to the rotator portion (101) of the present invention. The rotator portion (101) is initialized by the initial phase (x) from the FLL. The phase increment (y) is input to a modulo 256 accumulator (140) that is updated at a 64-chip rate. Both the x and y inputs are 8 bits in width.

The output of the 8-bit accumulator (140) is input to a shift register (125) or other shifting device that shifts the accumulated signal by five places to the right. This generates a three remaining bit signal ($R = R_2 R_1 R_0$) that is input to the hardware rotator (110) of the present invention. These are the bits that are applied to the hardware rotator (110) that instruct the rotator to perform the phase rotation a predetermined amount. For example, in one embodiment, R=001 ($R_2 = 0$, $R_1 = 0$, $R_0 = 1$) would instruct the rotator to rotate by $\pi/4$.

The hardware rotator (110) in the rotator portion (101) minimizes the coherence loss in the presence of large frequency offsets between the reverse link signal, received by the base station, and the local oscillator. This is achieved by phase shifting the signal by a (possibly) different amount during each 64-chip sub-segment. In this way, the instantaneous phase of the signal remains close to the average phase of the signal over each segment.

The hardware rotator (110) applies phase shifts to the despread signal (112), $e^{j2\pi f_n T_C}$, at the chip rate, prior to pilot filtering and demodulation that is performed by the DSP portion (102). The angle of rotation, in the preferred embodiment, is a multiple of 45° and the angle is kept constant over each sub-segment (64 chips).

Figure 2:
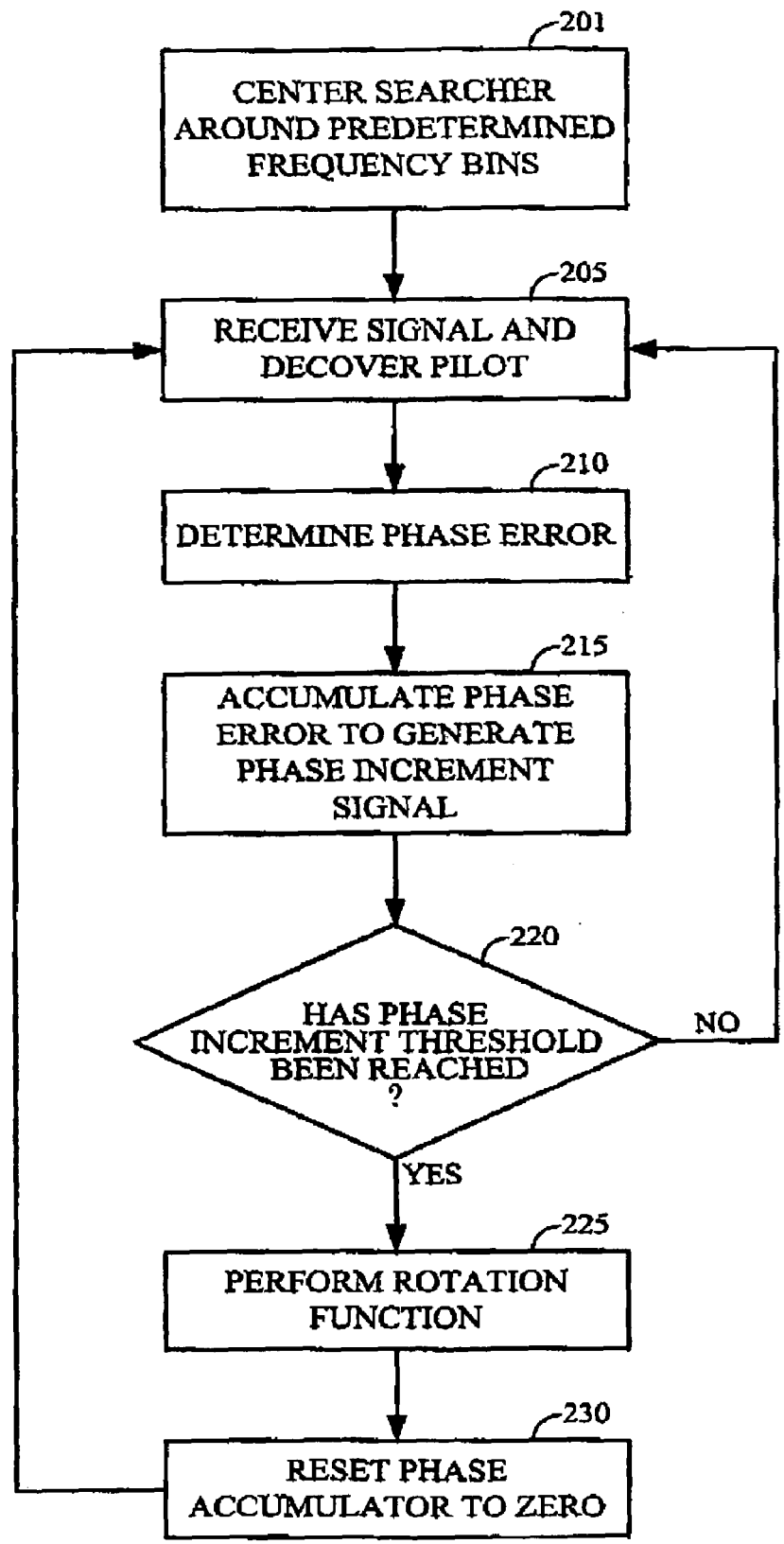
FIG. 2 shows a flowchart of a programmable rotator process of the present invention.

FIG. 2 illustrates a flowchart of a searcher process in accordance with the programmable rotator of the present invention. The process begins by centering the searcher on the expected frequency bins (step 201). The expected frequency bin is different for different applications and locations of base stations that incorporate the searcher of the present invention. For example, if the base station is located on a highway, the searcher may be centered on frequency bins +400 Hz and −400 Hz. If the base station is located on a railway, the frequency bins may be +1200 Hz and −1200 Hz, depending on the expected speeds of the trains.

The base station receives the pilot signal and decovers it (step 205). The decovering process is well known in the art and is not discussed further.

The FLL of the present invention then determines the phase error present in the signal (step 210). This error is determined after a 64-chip interval as described above. Alternate embodiments use other intervals of chip lengths.

The phase error is accumulated until it has reached a predetermined accumulated error (step 215). In the preferred embodiment, the predetermined accumulated error threshold is 45. For example, if after every 64-chip interval the error is 6°, this error is accumulated until the total error reaches 45°. If the accumulated error has reached the predetermined accumulated error threshold (step 220), the rotation is performed (step 225) as described above. If the threshold has not been reached (step 220), the process goes back to receiving and accumulating the phase errors (steps 205–220) until the threshold is reached.

After the rotation is performed (step 225), the accumulated phase error is reset to zero (step 230). The process then continues the tracking by returning to the receiving step (step 205) and repeating.

In an alternate embodiment, the same 8-PSK rotator can be used for both the FLL and the searcher. The rotator control in the searcher needs to be separated from the phase estimate output by the FLL. Instead, the value of the phase needs to be overwritten by the DSP and has to be interfaced to a higher layer of the software that implements the searcher process.

By supplying the phase increment, the DSP controls the point at which the rotator phase actually switches. The phase update is enabled every 64-chips.

The DSP of the preferred embodiment is limited to an 8-bit phase representation. Thus, the desired phase increments need to be quantized to be represented by an 8-bit integer number. This computation only concerns a 45° rotator since it is the preferred embodiment. The computations for a QPSK rotator would be different.

There is a tradeoff between optimal bin placement and hardware simplification and optimization. The general rule in choosing the phase rotator segment in chips, denoted as L, was minimizing the Mean loss function and Max loss function over the specified Doppler range. For a specified searcher mode (e.g., 3-Bin 45°), the L is a function of range. For example, L=464 is optimal for the $F_d = +/-400$ Hz range, but L=272 is optimal for the range of +/−800 Hz. The definition of range is arbitrary and does not have to be strict. One can assume that L=448 will be an optimal L value for some range just above +/−400 Hz and well below +/−800 Hz.

Figures 3, 4:
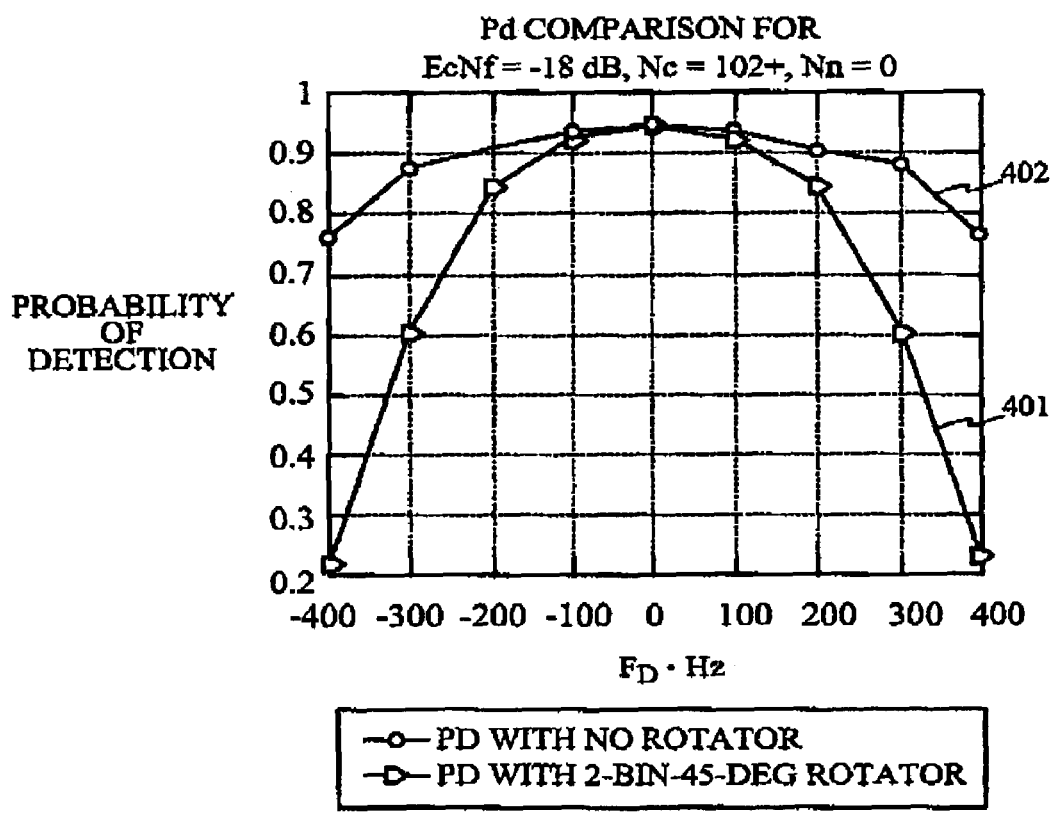
FIG. 3 shows a table of segment lengths (in PN chips) and phase increments for different frequency bins.
FIG. 4 shows a plot of the probability of pilot signal detection versus the frequency deviation in accordance with the programmable rotator of the present invention.

Using this approach, we can derive phase increment values to generate a value close to an appropriate L. The procedure for computing integer Phase increment (θ) is expressed as:

$$(L/64)\theta = 256/8,$$

where 256 is the 8-bit representation of a full 360° phase, and 256/8 is the representation of 45°. Thus, θ=256*8/L can be used to compute θ increments for the DSP. FIG. 3 illustrates the phase increments in LSBs and the corresponding L, in PN chips, using this alternate embodiment approach.

In the embodiment where the FLL and searcher share the rotator design, the knowledge of frequency can be shared between these two blocks. During the initial acquisition, if the searcher signal is found in one of the frequency bins, this bin center can be used to initialize the FLL. Similarly, when performing set maintenance searches, the searcher can be programmed to search only one frequency bin corresponding to the offset value in the FLL accumulator.

FIG. 4 illustrates a plot of the probability of pilot signal detection versus the frequency deviation of the pilot signal. This plot shows a comparison between the probability of detecting the pilot signal using a searcher without a rotator and a searcher using the programmable rotator of the present invention.

Both plots assume that EcNt=−18 dB, number of chips (Nc)=1024, and the number of non-coherent accumulations (Nn)=6. Additionally, the rotator used in the plot is a 2-bin, 45° rotator.

Referring to FIG. 4, it can be seen that the probability of a searcher without a rotator (401) detecting the pilot is substantially less than a searcher with the rotator (402) of the present invention. This is especially true when the pilot is experiencing a ±400 Hz or more of a Doppler shift.

Figure 5:
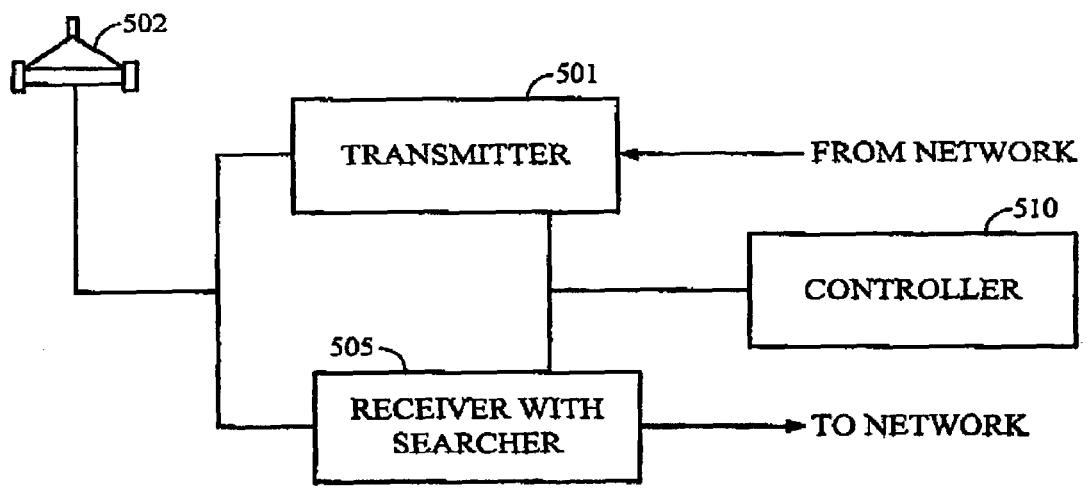
FIG. 5 shows a block diagram of a base station incorporating the searcher with the programmable rotator of the present invention.

FIG. 5 illustrates a block diagram of a base station incorporating the searcher of the present invention. The base station is comprised of a transmitter (501) that modulates and transmits signals over an air channel using the antenna (502). The transmitter gets its signals to be modulated and transmitted from the network that is coupled to the base station. This network can be a cellular infrastructure network, the public switched telephone network, or any other network requiring connection to a wireless base station.

The antenna (502) also receives signals from mobile communication devices. These signals are coupled to the receiver (505) of the base station for demodulation and transmission to the network. The receiver (505) comprises the searcher incorporating the FLL and programmable rotator of the present invention.

The base station is further comprised of a base station controller (510). The controller (510) is responsible for control of the base station's transmitter, receiver, and other components not shown but are well known in the art.

In summary, the searcher of the present invention can specify an arbitrary number of frequency bins and perform frequency as well as code space searching. By using a programmable rotator, the searcher is able to find and track a signal that has a large frequency error, such as those experiencing a Doppler effect caused by movement away from and towards the base station.

We claim:

1. A method of finding a signal having a deviation from an expected frequency, the method comprising:
    first phase rotating a signal to partially reduce a phase error of the signal and produce a partially rotated output signal;
    accumulating a plurality of chips from the partially rotated output signal to form segments of the partially rotated output signal;
    second phase rotating the segments of the partially rotated output signal to further reduce a phase error of the segments by adjusting the phase over each segment; and
    generating a phase increment signal based on the phase error of the segments, the first phase rotating the signal to partially reduce the phase error of the signal based on an accumulation of the phase increment signal.

2. A method in accordance with claim 1, further comprising:
    generating a phase increment signal based on the phase error of the segments the first phase rotating the signal to partially reduce the phase error of the signal based on the phase increment signal.

3. A method in accordance with claim 2, wherein the first phase rotating the signal to partially reduce the phase error of the signal comprises compensating for instantaneous signal phase changes over each segment.

4. A method in accordance with claim 3, wherein the second phase rotating the signal to further reduce the phase error of the segments comprises compensating for instantaneous signal phase changes over each segment by partially phase rotating the signal based on an average phase of the signal over multiple chips.

5. A searcher for finding the frequency of a received signal comprising a plurality of segments, the searcher comprising:
    a first phase rotator configured to phase rotate a signal to partially reduce a phase error of the signal and produce a first phase rotator output signal;
    an accumulator configured to accumulate a plurality of chips from the first phase rotator output signal to form segments of the first phase rotator output signal;
    a second rotator configured to phase rotate the segments of the first phase rotator output signal to further reduce a phase error of the segments by adjusting the phase over each segment; and
    wherein the second rotator is implemented within a frequency locked loop producing a phase increment signal based on the phase error of the segments, the first phase rotator configured to phase rotate the signal based on an accumulation of the phase increment signal.

6. A searcher in accordance with claim 5, wherein the second rotator is implemented within a frequency locked loop producing a phase increment signal based on the phase error of the segments, the first phase rotator configured to phase rotate the signal based on the phase increment signal.

7. A searcher in accordance with claim 6, wherein the first phase rotator is configured to partially reduce the phase error of the signal by compensating for instantaneous signal phase changes over each segment.

8. A searcher in accordance with claim 7, wherein the second phase rotator is configured to partially phase rotate the segments based on an average phase of the signal over multiple chips.

9. A searcher in accordance with claim 8, wherein the first phase rotator is a high-speed low-resolution phase rotator and the second phase rotator is a low-speed high-resolution phase rotator.

10. A searcher in accordance with claim 9, wherein the first phase rotator is a hardware rotator and the second phase rotator is a DSP rotator.

11. A searcher for finding the frequency of a received signal comprising a phase error, the searcher comprising:
- a frequency locked loop that generates a phase increment signal in response to the phase error of the received signal;
- a programmable rotator coupled to the frequency locked loop, the programmable rotator performing a phase rotation function;
- a phase error accumulator accumulating results of the phase increment signals from the frequency locked loop and generating a control signal that instructs the programmable rotator to perform the phase rotation function; and
- a shift register coupled between the phase error accumulator and the programmable rotator, the shift register truncating a predetermined number of bits of the control signal, wherein the frequency locked loon further comprises means for generating an initial phase signal that is coupled to the programmable rotator and initializes the programmable rotator to a predetermined starting phase.

12. The searcher of claim 11 wherein the programmable rotator is an 8-Phase Shift Keying rotator.

13. The searcher of claim 11 wherein the programmable rotator is a Quadrature Phase Shift Keying rotator.

14. The searcher of claim 11 wherein the phase error accumulator accumulates phase increment signals over a 64-chip interval.

15. The searcher of claim 13 wherein the frequency locked loop further comprises means for generating an initial phase signal that is coupled to the Quadrature Phase Shift Keying programmable rotator and initializes the Quadrature Phase Shift Keying programmable rotator to a predetermined starting phase.

* * * * *